United States Patent
Page et al.

(10) Patent No.: US 12,358,566 B1
(45) Date of Patent: Jul. 15, 2025

(54) MUD FLAP ASSEMBLY FOR MOBILE HOME TRANSPORT

(71) Applicants: Darrin Page, Attalla, AL (US); Mark Gibbs, Attalla, AL (US)

(72) Inventors: Darrin Page, Attalla, AL (US); Mark Gibbs, Attalla, AL (US)

( * ) Notice: Subject to any disclaimer, the term of this patent is extended or adjusted under 35 U.S.C. 154(b) by 167 days.

(21) Appl. No.: 18/208,985

(22) Filed: Jun. 13, 2023

(51) Int. Cl.
*B62D 25/18* (2006.01)

(52) U.S. Cl.
CPC .................................. *B62D 25/182* (2013.01)

(58) Field of Classification Search
CPC .. B62D 25/182; B62D 25/188; B62D 25/163; B62D 25/168; B62D 25/18
See application file for complete search history.

(56) References Cited

U.S. PATENT DOCUMENTS

| | | | | |
|---|---|---|---|---|
| 1,904,342 | A * | 4/1933 | Zaiger | B62D 25/18 280/851 |
| 3,091,478 | A * | 5/1963 | Ambli | B62D 25/188 280/851 |
| 3,713,669 | A * | 1/1973 | Evans | B62D 25/188 280/851 |
| 3,830,520 | A * | 8/1974 | Kelly | B62D 25/188 280/851 |
| 3,877,722 | A * | 4/1975 | Conner | B62D 25/188 280/154 |
| 4,572,532 | A * | 2/1986 | Early | B62D 25/188 24/67.11 |
| D417,422 | S | 12/1999 | Rogers | |
| 6,485,059 | B2 | 11/2002 | Burnstein | |
| 6,786,512 | B2 * | 9/2004 | Morin | B62D 25/188 280/847 |
| 6,799,808 | B1 * | 10/2004 | Walters | B62D 25/182 298/1 SG |
| 7,407,194 | B1 * | 8/2008 | Alley | B62D 25/188 280/154 |
| 7,475,911 | B2 | 1/2009 | Edwards | |
| 7,607,698 | B2 * | 10/2009 | Cicansky | B62D 25/188 280/154 |
| 7,909,343 | B2 * | 3/2011 | Archer | B62D 25/186 280/847 |
| 8,579,314 | B2 * | 11/2013 | Prazen | B62D 25/188 280/154 |

(Continued)

FOREIGN PATENT DOCUMENTS

WO 2019066942 4/2019

*Primary Examiner* — James A Shriver, II
*Assistant Examiner* — Ian Bryce Shelton
(74) *Attorney, Agent, or Firm* — Kyle A. Fletcher, Esq.

(57) ABSTRACT

The mud flap assembly for mobile home transport is for use with a trailer that transports the components of a prefabricated building. The mud flap assembly for mobile home transport forms a protection space under the trailer. The protection space prevents road debris from escaping from under the trailer and damaging the prefabricated building. The mud flap assembly for mobile home transport removably attaches to the trailer. The mud flap assembly for mobile home transport folds into a storage position after the deployed mud flap assembly for mobile home transport has been removed from the trailer. The mud flap assembly for mobile home transport incorporates a plurality of barrier plate structures, a mounting structure, and a weighting structure.

13 Claims, 4 Drawing Sheets

(56) References Cited

U.S. PATENT DOCUMENTS

| | | | |
|---|---|---|---|
| 8,783,727 B2 * | 7/2014 | Flaman | B62D 25/182 |
| | | | 280/852 |
| 9,102,363 B2 * | 8/2015 | Atkinson | B62D 25/182 |
| 9,221,390 B1 * | 12/2015 | Begley | B62D 35/001 |
| 9,434,419 B1 | 9/2016 | Casto, Jr. | |
| 9,821,856 B1 | 11/2017 | Caruso | |
| 10,023,242 B1 * | 7/2018 | Wurzer | B62D 25/188 |
| 10,300,960 B1 * | 5/2019 | Wingen | B60D 1/58 |
| 10,421,498 B2 * | 9/2019 | Blomberg | B62D 25/163 |
| 11,958,538 B2 * | 4/2024 | Morgan | B62D 25/188 |
| 2003/0141713 A1 * | 7/2003 | Morin | B62D 25/188 |
| | | | 280/847 |
| 2006/0103129 A1 * | 5/2006 | Edwards | B62D 25/188 |
| | | | 280/848 |
| 2007/0216128 A1 * | 9/2007 | Morton | B62D 25/188 |
| | | | 280/154 |
| 2008/0185810 A1 * | 8/2008 | Archer | B62D 25/188 |
| | | | 280/154 |
| 2008/0277895 A1 * | 11/2008 | Cicansky | B62D 25/188 |
| | | | 280/154 |
| 2008/0310179 A1 * | 12/2008 | Bates | B62D 25/188 |
| | | | 362/549 |
| 2009/0194967 A1 * | 8/2009 | Vaughn | B62D 25/188 |
| | | | 280/154 |
| 2013/0168953 A1 * | 7/2013 | Prazen | B62D 25/188 |
| | | | 280/851 |
| 2013/0221650 A1 | 8/2013 | Wiltshire | |
| 2014/0042736 A1 * | 2/2014 | Flaman | B62D 25/182 |
| | | | 280/851 |
| 2014/0312604 A1 * | 10/2014 | Carrillo | B62D 25/168 |
| | | | 29/428 |
| 2015/0014976 A1 * | 1/2015 | Atkinson | B62D 25/182 |
| | | | 280/848 |
| 2019/0168819 A1 * | 6/2019 | Blomberg | B62D 25/163 |
| 2020/0262487 A1 * | 8/2020 | Morgan | B62D 25/182 |
| 2024/0067274 A1 * | 2/2024 | Peterson | B62D 25/168 |

* cited by examiner

MUD FLAP ASSEMBLY FOR MOBILE HOME TRANSPORT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of mudguards comprising detachable parts. (B62D25/182)

SUMMARY OF INVENTION

The mud flap assembly for mobile home transport is configured for use with a trailer that transports the components of a prefabricated building (hereinafter prefabricated building). The mud flap assembly for mobile home transport forms a protection space under the trailer. The protection space prevents road debris from escaping from under the trailer and damaging the prefabricated building. The mud flap assembly for mobile home transport removably attaches to the trailer. The mud flap assembly for mobile home transport folds into a storage position after the deployed mud flap assembly for mobile home transport has been removed from the trailer. The mud flap assembly for mobile home transport comprises a plurality of barrier plate structures, a mounting structure, and a weighting structure. The mounting structure removably attaches the plurality of barrier plate structures to the trailer. The plurality of barrier plate structures suspends the weighting structure from the trailer.

These together with additional objects, features and advantages of the mud flap assembly for mobile home transport will be readily apparent to those of ordinary skill in the art upon reading the following detailed description of the presently preferred, but nonetheless illustrative, embodiments when taken in conjunction with the accompanying drawings.

In this respect, before explaining the current embodiments of the mud flap assembly for mobile home transport in detail, it is to be understood that the mud flap assembly for mobile home transport is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the mud flap assembly for mobile home transport.

It is therefore important that the claims be regarded as including such equivalent construction insofar as they do not depart from the spirit and scope of the mud flap assembly for mobile home transport. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
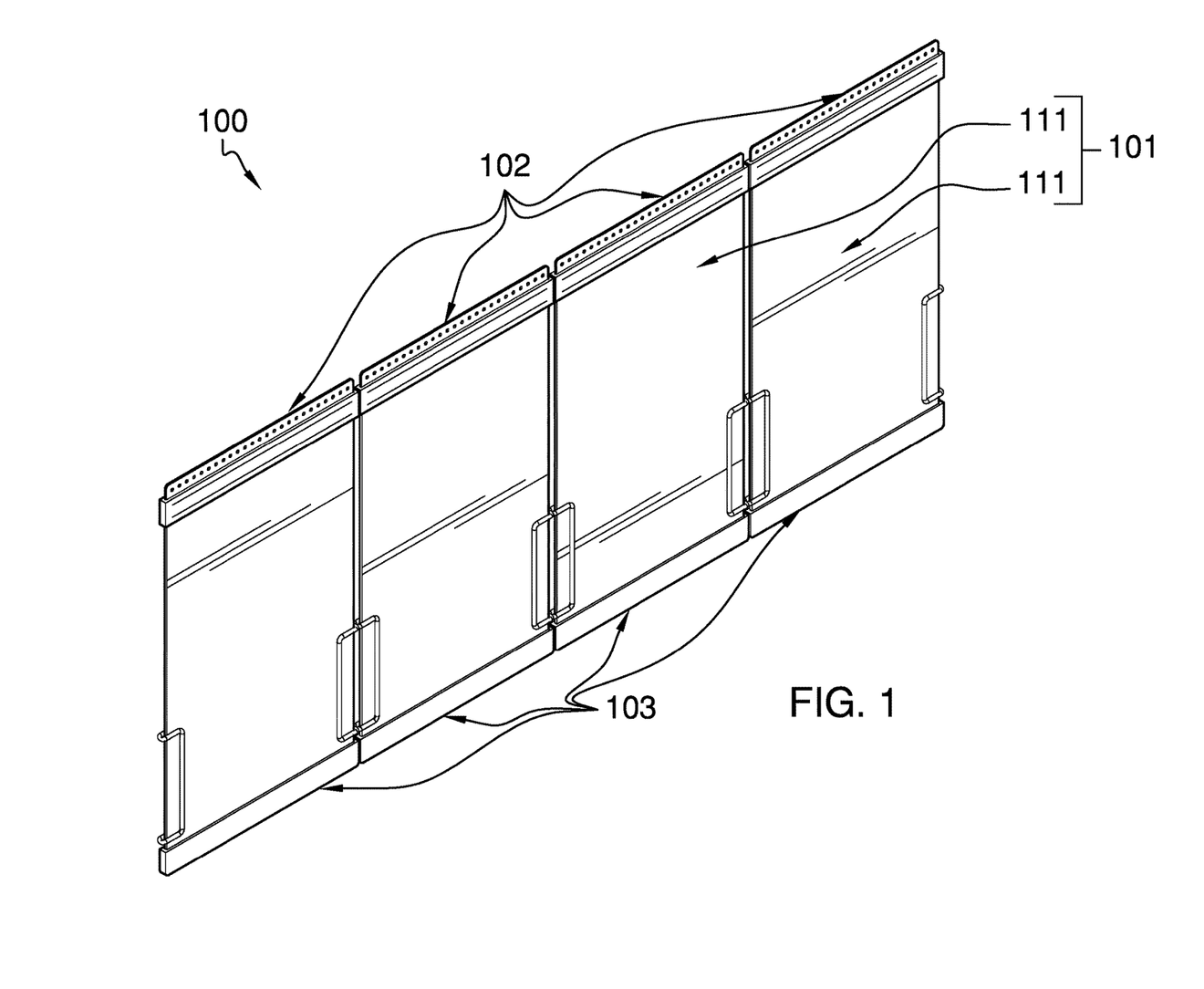
FIG. 1 is a perspective view of an embodiment of the disclosure.
Figure 2:
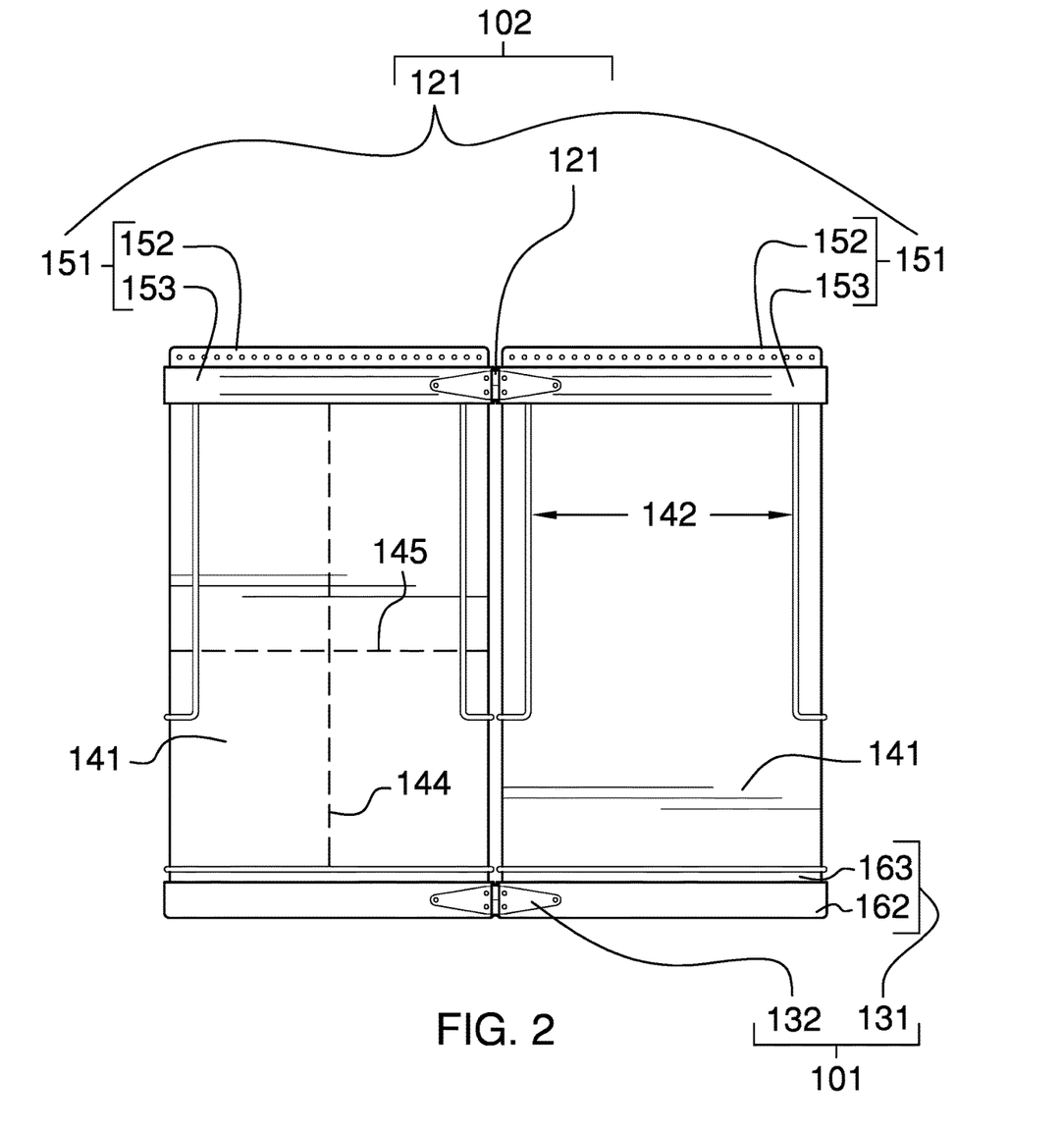
FIG. 2 is an anterior view of an embodiment of the disclosure.
Figure 3:
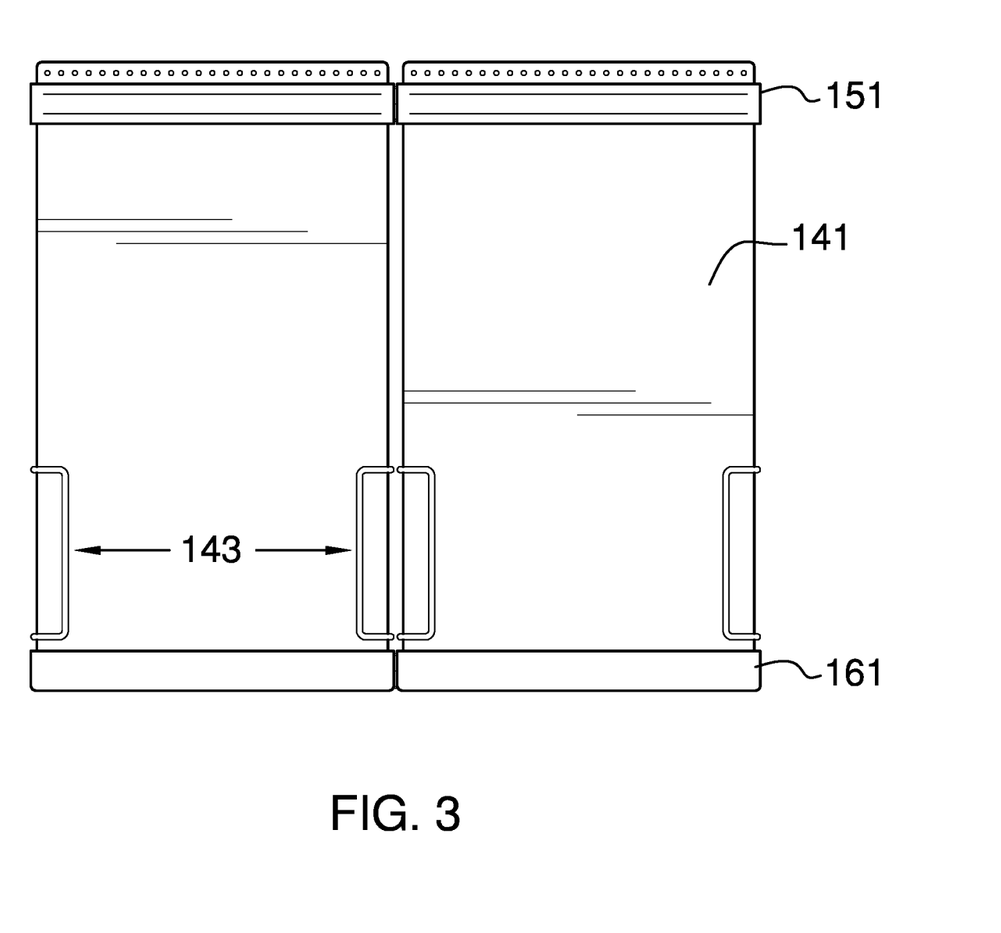
FIG. 3 is a posterior view of an embodiment of the disclosure.
Figure 4:
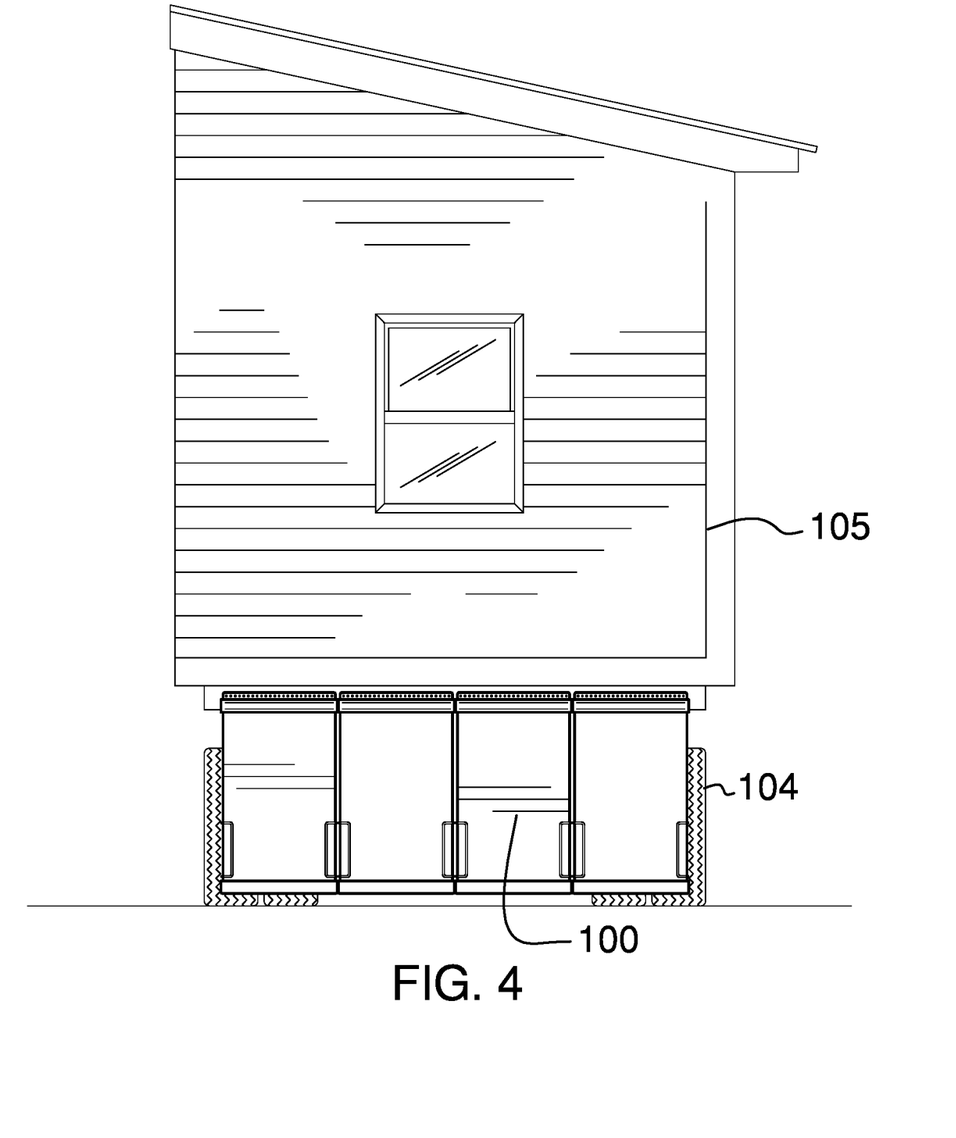
FIG. 4 is an in-use view of an embodiment of the disclosure.

Detailed reference will now be made to one or more potential embodiments of the disclosure, which are illustrated in FIGS. 1 through 4.

The mud flap assembly for mobile home transport 100 (hereinafter invention) is configured for use with a trailer 104 that transports the components of a prefabricated building 105 (hereinafter prefabricated building 105). The invention 100 forms a protection space under the trailer 104. The protection space prevents road debris from escaping from under the trailer 104 and damaging the prefabricated building 105. The invention 100 removably attaches to the trailer 104. The invention 100 folds into a storage position after the deployed invention 100 has been removed from the trailer 104. The invention 100 comprises a plurality of barrier plate structures 101, a mounting structure 102, and a weighting structure 103. The mounting structure 102 removably attaches the plurality of barrier plate structures 101 to the trailer 104. The plurality of barrier plate structures 101 suspends the weighting structure 103 from the trailer 104. The trailer 104 is defined elsewhere in this disclosure. The prefabricated building 105 is defined elsewhere in this disclosure.

The plurality of barrier plate structures 101 forms a boundary structure. The plurality of barrier plate structures 101 forms a barrier between the area underneath the trailer 104 and the prefabricated building 105 transported by the trailer 104. The plurality of barrier plate structures 101 forms a protection space that contains debris from a road in the space underneath the trailer 104. The plurality of barrier plate structures 101 prevents the road debris from soiling the prefabricated building 105. The plurality of barrier plate structures 101 comprises a collection of individual barrier plate structures 111.

Each individual barrier plate structure 111 selected from the plurality of barrier plate structures 101 is a disk shaped structure. The selected individual barrier plate structure 111 has a rectangular shape. The selected individual barrier plate structure 111 is a flexible structure. The selected individual barrier plate structure 111 is a semi-rigid structure with a relatively high modulus such that wind will not significantly deform the selected individual barrier plate structure 111. The selected individual barrier plate structure 111 is a fluid impermeable structure. The selected individual barrier plate structure 111 forms a portion of the boundary structure that contains road debris within the protection space underneath the trailer 104. The individual barrier plate structures 111 of the plurality of barrier plate structures 101 are aligned next to each other such that the individual disk structures of each plurality of barrier plate structures 101 combine to form a lateral disk structure.

Each individual barrier plate structure 111 selected from the plurality of barrier plate structures 101 further comprises a barrier disk structure 141, a plurality of anterior stiffening structures 142, and a plurality of posterior stiffening structures 143. The individual barrier plate structure 111 selected from the plurality of barrier plate structures is identical. It shall be noted that the barrier disk structure 141 may be referred to as a barrier structure 141.

The barrier disk structure 141 is a disk shaped structure. The barrier disk structure 141 has a rectangular shape. The barrier disk structure 141 is a flexible structure. The barrier disk structure 141 is a semi-rigid structure. The barrier disk structure 141 is a fluid impermeable structure. The barrier disk structure 141 forms a portion of the barrier that forms the boundary structure of the plurality of barrier plate structures 101 that encloses the protection space formed beneath the trailer 104. The barrier disk structure 141 is formed from a relatively high modulus such that wind will not significantly deform the barrier disk structure 141.

The barrier disk structure 141 is further defined with a vertical axis 144 and a horizontal axis 145. The vertical axis is an axis that bifurcates the deployed barrier disk structure 141 in the vertical direction. The horizontal axis 145 is an axis that bifurcates the deployed barrier disk structure 141 in the horizontal direction. The horizontal axis 145 is perpendicular to the vertical axis 144. The horizontal axis 145 intersects the vertical axis 144 at the center of the barrier disk structure 141.

The plurality of anterior stiffening structures 142 is a mechanical structure. The plurality of anterior stiffening structures 142 attaches to the anterior congruent end of the disk structure of the deployed barrier disk structure 141. The plurality of anterior stiffening structures 142 stabilizes the barrier disk structure 141.

The plurality of posterior stiffening structures 143 is a mechanical structure. The plurality of posterior stiffening structures 143 attaches to the posterior congruent end of the disk structure of the deployed barrier disk structure 141. The plurality of posterior stiffening structures 143 stabilizes the barrier disk structure 141 by increasing the modulus of the barrier disk structure 141.

The mounting structure 102 is a mechanical structure. The mounting structure 102 is a fastening device. The mounting structure 102 secures the plurality of barrier plate structures 101 to the trailer 104. The mounting structure 102 removably attaches the plurality of barrier plate structures 101 to the trailer 104. The mounting structure 102 is a rotating structure. The mounting structure 102 is a foldable structure. The mounting structure 102 enables the invention 100 to be folded into a storage position when the invention 100 is not in use. The mounting structure 102 comprises a plurality of barrier plate mounts 121 and a plurality of superior hinges 122.

Each plurality of barrier plate mounts 121 comprises a collection of individual barrier plate mounts 151. Each individual barrier plate mount 151 selected from the plurality of barrier plate mounts 121 is a fastening device. An individual barrier plate mount 151 selected from the plurality of barrier plate mounts 121 attaches to an associated individual barrier plate structure 111 selected from the plurality of barrier plate structures 101 to the trailer 104. Each selected individual barrier plate mount 151 is a rotating structure. The selected individual barrier plate mount 151 secures its associated individual barrier plate structure 111 to the trailer 104 such that the individual barrier plate structure 111 rotates relative to the trailer 104. Each individual barrier plate mount 151 selected from the plurality of barrier plate mounts 121 comprises a flat bar structure 152 and a superior anchor plate structure 153. Each individual barrier plate mount 151 selected from the plurality of barrier plate mounts 121 is identical.

The flat bar structure 152 is a flat bar. The superior anchor plate structure 153 is a disk shaped structure. The superior anchor plate structure 153 attaches the flat bar structure 152 to the barrier disk structure 141 of the associated individual barrier plate structure 111 such that the major axis of the flat bar structure 152 is parallel to the horizontal axis 145 of the barrier disk structure 141. The superior anchor plate structure 153 attaches the flat bar structure 152 to a lateral face of the disk structure of the barrier disk structure 141. The flat bar structure 152 removably attaches the superior anchor plate structure 153 to the trailer 104 using hardware.

The plurality of superior hinges 122 is a fastening structure. The plurality of superior hinges 122 interconnects the plurality of barrier plate mounts 121 such that the plurality of barrier plate mounts 121 can rotate between a storage position and a deployed position. Each superior hinge structure selected from the plurality of superior hinges 122 is a fastening device. Each selected superior hinge structure is a rotating device. Each selected superior hinge structure attaches to an initial individual barrier plate mount 151 selected from the plurality of barrier plate mounts 121 to an adjacent individual barrier plate mount 151 selected from the plurality of barrier plate mounts 121 such that the adjacent selected individual barrier plate mount 151 will rotate relative to the initially selected individual barrier plate mount 151. Each selected superior hinge structure rotates the adjacent selected individual barrier plate structure 111 between the deployed position and the storage position.

The weighting structure 103 is a structure that attaches to the plurality of barrier plate structures 101. The plurality of barrier plate structures 101 suspends the weighting structure 103 from the trailer 104. The weighting structure 103 attaches to the plurality of barrier plate structures 101. The weighting structure 103 maintains the integrity of the protection space formed by the plurality of barrier plate structures 101. The weighting structure 103 adds an additional mass to the plurality of barrier plate structures 101 remains in a roughly fixed position as the trailer 104 transports the prefabricated building 105. The weighting structure 103 is a rotating structure. The weighting structure 103 is a foldable structure. The weighting structure 103 enables the invention 100 to be folded into a storage position when the invention 100 is not in use. The weighting structure 103 comprises a collection of individual weight bar structures 161.

The plurality of weight bar structures 131 attaches to the plurality of barrier plate structures 101. The plurality of weight bar structures 131 adds an additional mass to the plurality of barrier plate structures 101 that stabilizes the plurality of barrier plate structures 101 as the wind blowing around the trailer 104 blows against the plurality of barrier plate structures 101. The plurality of weight bar structures 131 stabilizes the boundary structure that encloses the protection space formed underneath the trailer 104. Each individual weight bar structure 161 selected from the plurality of weight bar structures 131 attaches to an associated individual barrier plate structure 111 selected from the plurality of barrier plate structures 101. Each individual weight bar structure 161 selected from the plurality of weight bar structures 131 comprises a weight disk structure 162 and an inferior anchor plate 163. Each individual weight bar structure 161 selected from the plurality of weight bar structures 131 is identical.

The inferior anchor plate 163 is a disk shaped structure. The inferior anchor plate 163 attaches the weight disk structure 162 to the barrier disk structure 141 of the associated individual barrier plate structure 111 such that the major axis of the weight disk structure 162 is parallel to the horizontal axis 145 of the barrier disk structure 141. The inferior anchor plate 163 attaches the weight disk structure 162 to the edge of the perimeter of the barrier disk structure 141 that is distal from the individual barrier plate mount 151.

The plurality of inferior hinges 132 is a fastening structure. The plurality of inferior hinges 132 interconnects the plurality of weight bar structures 131 such that the plurality of weight bar structures 131 can rotate between the storage position and the deployed position. Each inferior hinge structure selected from the plurality of inferior hinges 132 is a fastening device. Each selected inferior hinge structure is a rotating device. Each selected inferior hinge structure attaches to an initial individual weight bar structure 161 selected from the plurality of weight bar structures 131 to an adjacent individual weight bar structure 161 selected from the plurality of weight bar structures 131 such that the adjacent selected individual weight bar structure 161 will rotate relative to the initially selected individual weight bar structure 161. Each selected inferior hinge structure rotates the adjacent selected individual weight bar structure 161 between the deployed position and the storage position.

The plurality of superior hinges 122 and the plurality of inferior hinges 132 work through the plurality of barrier plate mounts 121 and the plurality of weight bar structures 131 respectively to assemble the plurality of barrier plate structures 101 into the deployed lateral disk shape of the plurality of barrier plate structures 101.

The following definitions were used in this disclosure:

Aft: As used in this disclosure, aft is term that relates a first object to a second object. When the second object is closer to the stern of a vehicle, the second object is said to be aft of the first object. The term is commonly used on vessels and vehicles.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Boundary Structure: As used in this disclosure, a boundary structure is a barrier that separates a first object from a second object such that the second object cannot damage the first object.

Bow: As used in this disclosure, the bow refers to the anterior side of an object, vehicle, or vessel. Specifically, the bow refers to the structure that leads the object, vehicle, or vessel into the primary sense of direction of the object vehicle, or vessel.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Flat Bar: As used in this disclosure, a flat bar is a metal rectangular disk structure. The span of the length of the major axis of a traditional flat bar is significantly longer than the span of the length of the minor axis of the flat bar. By significantly longer is meant the ratio of the span of the length of the major axis to the span of the length of the minor axis is greater than or equal to 8. A flat bar structure with a length ratio of less than eight is referred to as a short flat bar. A punched flat bar is a flat bar that has a plurality of apertures that are formed through the faces of the disk structure of the flat bar. A punched flat bar is often called a perforated flat bar. Generally the center points of the plurality of apertures of a punched flat bar are aligned to be parallel to the major axis of the flat bar. The flat bar is commonly used as a structural element. The flat bar is a readily and commercially available product. The flat bar is also referred to as a flat iron.

Flexible: As used in this disclosure, flexible refers to an object or material that will deform when a force is applied to it but that will not necessarily return to its original shape when the deforming force is removed.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Forward: As used in this disclosure, forward is term that relates a first object to a second object. When the first object is closer to the bow of a vehicle, the first object is said to be forward of the second object. The term is commonly used on vessels and vehicles.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Hardware: As used in this disclosure, refers to one or more incidental objects: 1) that are readily and commercially available; and, 2) that are associated with the installation, operation, or maintenance of a primary object.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Incidental: As used in this disclosure, incidental refers to a second object that is associated with a first object but that: 1) does not significantly affect the characteristics of the first object; and, 2) the function of which can be readily replaced by or substituted with a third object.

Inelastic Nature: As used in this disclosure, an inelastic nature refers to a flexible structure that maintains its new shape after the flexible structure has been deformed.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

Lateral Disk Structure: As used in this disclosure, a lateral plate structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed from posterior side towards the anterior side. The right side of any object is the same side as the right side of the human body when the object is viewed from posterior side towards the anterior side. The left and right sides of the object remain unchanged by changes to the direction from which the object is viewed.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Major and Minor Axes: As used in this disclosure, the major and minor axes refer to a pair of perpendicular axes that are defined within a structure. The length of the major axis is always greater than or equal to the length of the minor axis. The major axis forms the longest symmetric bifurcation of a structure selected from the group consisting of: a) the structure; or, b) the perimetrical boundary of the structure. The major and minor axes intersect at the center of the structure. The major axis is always parallel or perpendicular to an edge of a rectangular or rectilinear structure.

Mass: As used in this disclosure, refers to a quantity of matter within a structure. Mass is measured and quantified by the reaction of the structure to a force. Mass can also be roughly quantified as a function of atomic composition and the number of atoms contained within the structure. The term weight refers to the quantification of a mass that is exposed to the force of gravity.

Modulus: As used in this disclosure, the modulus of a flexible or elastomeric structure is a function that describes the resistance to the deformation of the flexible or elastomeric structure as a function of the force applied to the flexible or elastomeric structure. When comparing modulus, a larger modulus is taken to imply a greater force is required to achieve the same deformation.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Pivot: As used in this disclosure, a pivot is a rod or shaft around which an object rotates or swings.

Posterior: As used in this disclosure, posterior is a term that is used to refer to the side of an object that is distal or in the opposite direction of the anterior side. When comparing two items, the posterior item is the item that is distal from the anterior of the object.

Prefabricated Building: As used in this disclosure, a prefabricated building refers to a building that built from subcomponents that are manufactured in a factory. The subcomponents are shipped to the site of the desired location of the building where the subcomponents are assembled to form the building.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protection Space: As used in this disclosure, a protection space is a space formed by a boundary structure. The boundary structure forms a protective barrier that protects objects outside the protection space from potential dangers from the operation of a device or process contained within the protection space.

Protective Barrier: As used in this disclosure, a protected barrier is a boundary structure. The boundary structure forms a barrier that separates a first object from the environment such that the environment cannot damage the first object.

Relaxed Shape: As used in this disclosure, a structure is considered to be in its relaxed state when no shear, strain, or torsional forces are being applied to the structure.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Suspend: As used in this disclosure, to suspend an object means to support an object such that the inferior end of the object does not form a significant portion of the load path of the object.

Tractor: As used in this disclosure, a tractor refers to a vehicle that is used to tow a trailer.

Trailer: As used in this disclosure, a trailer is an unpowered wheeled vehicle that is towed by a powered vehicle such as a tractor.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Close

The following definition was used in this disclosure:

The following definitions and directional references were used in this disclosure:

With respect to the above description, it is to be realized that the optimum dimensional relationship for the various components of the invention described above and in FIGS. 1 through X include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A mud flap assembly for mobile home transport comprising:
   a plurality of barrier plate structures, a mounting structure, and a weighting structure;
   wherein the mud flap assembly for mobile home transport is configured for use with a trailer that transports a prefabricated building;
   wherein the mounting structure removably attaches the plurality of barrier plate structures to the trailer;
   wherein the plurality of barrier plate structures suspends the weighting structure from the trailer;
   wherein the weighting structure is a structure that attaches to the plurality of barrier plate structures;

wherein the plurality of barrier plate structures suspends the weighting structure from the trailer;
wherein the weighting structure attaches to the plurality of barrier plate structures;
wherein the weighting structure adds an additional mass to the plurality of barrier plate structures remains in a roughly fixed position as the trailer transports the prefabricated building;
wherein the weighting structure enables the mud flap assembly for mobile home transport to be folded into a storage position.

2. The mud flap assembly for mobile home transport according to claim 1,
wherein the mud flap assembly for mobile home transport forms a protection space under the trailer;
wherein the mud flap assembly for mobile home transport removably attaches to the trailer;
wherein the mud flap assembly for mobile home transport folds into the storage position.

3. The mud flap assembly for mobile home transport according to claim 2,
wherein the plurality of barrier plate structures forms a boundary structure;
wherein the plurality of barrier plate structures forms a barrier between the area underneath the trailer and the prefabricated building transported by the trailer;
wherein the plurality of barrier plate structures forms a protection space in the space underneath the trailer.

4. The mud flap assembly for mobile home transport according to claim 3,
wherein the plurality of barrier plate structures comprises a collection of individual barrier plate structures;
wherein a selected individual barrier plate structure from the plurality of barrier plate structures has a rectangular shape;
wherein the selected individual barrier plate structure is a flexible r fluid impermeable structure;
wherein the selected individual barrier plate structure forms a portion of the boundary structure;
wherein the individual barrier plate structures of the plurality of barrier plate structures are aligned next to each other such that each plurality of barrier plate structures combine to form a lateral disk structure;
wherein the individual barrier plate structure selected from the plurality of barrier plate structures is identical.

5. The mud flap assembly for mobile home transport according to claim 4,
wherein the mounting structure is a mechanical structure;
wherein the mounting structure is a fastening device;
wherein the mounting structure secures the plurality of barrier plate structures to the trailer;
wherein the mounting structure removably attaches the plurality of barrier plate structures to the trailer;
wherein the mounting structure is a rotating structure;
wherein the mounting structure is a foldable structure;
wherein the mounting structure enables the mud flap assembly for mobile home transport to be folded into the storage position.

6. The mud flap assembly for mobile home transport according to claim 5,
wherein each individual barrier plate structure selected from the plurality of barrier plate structures further comprises a barrier structure, a plurality of anterior stiffening structures, and a plurality of posterior stiffening structures;
wherein the plurality of anterior stiffening structures and the plurality of posterior stiffening structures attach to the barrier disk structure.

7. The mud flap assembly for mobile home transport according to claim 6,
wherein the barrier structure has a rectangular shape;
wherein the barrier structure is a flexible, fluid impermeable structure;
wherein the barrier structure forms a portion of the barrier that forms the boundary structure of the plurality of barrier plate structures that encloses the protection space formed beneath the trailer;
wherein the barrier structure is further defined with a vertical axis and a horizontal axis;
wherein the vertical axis is an axis that bifurcates the deployed barrier structure in the vertical direction;
wherein the horizontal axis is an axis that bifurcates the deployed barrier structure in the horizontal direction;
wherein the horizontal axis is perpendicular to the vertical axis;
wherein the horizontal axis intersects the vertical axis at the center of the barrier structure.

8. The mud flap assembly for mobile home transport according to claim 7,
wherein the plurality of anterior stiffening structures is a mechanical structure;
wherein the plurality of anterior stiffening structures attaches to the anterior congruent end of the structure of the deployed barrier structure;
wherein the plurality of anterior stiffening structures stabilizes the barrier structure;
wherein the plurality of posterior stiffening structures is a mechanical structure;
wherein the plurality of posterior stiffening structures attaches to the posterior congruent end of the structure of the deployed barrier structure;
wherein the plurality of posterior stiffening structures stabilizes the barrier structure by increasing the modulus of the barrier structure.

9. The mud flap assembly for mobile home transport according to claim 8,
wherein the mounting structure comprises a plurality of barrier plate mounts and a plurality of superior hinges;
wherein each plurality of barrier plate mounts comprises a collection of individual barrier plate mounts;
wherein each individual barrier plate mount selected from the plurality of barrier plate mounts is a fastening device;
wherein an individual barrier plate mount selected from the plurality of barrier plate mounts attaches to an associated individual barrier plate structure selected from the plurality of barrier plate structures to the trailer;
wherein each selected individual barrier plate mount is a rotating structure;
wherein the selected individual barrier plate mount secures its associated individual barrier plate structure to the trailer such that the individual barrier plate structure rotates relative to the trailer;
wherein the plurality of superior hinges is a fastening structure;
wherein the plurality of superior hinges interconnects the plurality of barrier plate mounts such that the plurality of barrier plate mounts can rotate between the storage position and a deployed position;
wherein each superior hinge structure selected from the plurality of superior hinges is a fastening device;

wherein each selected superior hinge structure is a rotating device;
wherein each selected superior hinge structure attaches to an initial individual barrier plate mount selected from the plurality of barrier plate mounts to an adjacent individual barrier plate mount selected from the plurality of barrier plate mounts such that the adjacent selected individual barrier plate mount will rotate relative to the initially selected individual barrier plate mount;
wherein each selected superior hinge structure rotates the adjacent selected individual barrier plate structure between the deployed position and the storage position.

10. The mud flap assembly for mobile home transport according to claim 9,
wherein the weighting structure comprises a collection of individual weight bar structures;
wherein the plurality of weight bar structures attaches to the plurality of barrier plate structures;
wherein the plurality of weight bar structures adds an additional mass to the plurality of barrier plate structures that stabilizes the plurality of barrier plate structures as the wind blowing around the trailer blows against the plurality of barrier plate structures;
wherein each individual weight bar structure selected from the plurality of weight bar structures attaches to an associated individual barrier plate structure selected from the plurality of barrier plate structures.

11. The mud flap assembly for mobile home transport according to claim 10,
wherein each individual weight bar structure selected from the plurality of weight bar structures comprises a weight structure and an inferior anchor plate;
wherein each individual weight bar structure selected from the plurality of weight bar structures is identical;
wherein the inferior anchor plate attaches the weight structure to the barrier structure of the associated individual barrier plate structure such that the major axis of the weight structure is parallel to the horizontal axis of the barrier structure;
wherein the inferior anchor plate attaches the weight structure to the edge of the perimeter of the barrier structure that is distal from the individual barrier plate mount;
wherein the plurality of inferior hinges is a fastening structure;
wherein the plurality of inferior hinges interconnects the plurality of weight bar structures such that the plurality of weight bar structures can rotate between the storage position and the deployed position;
wherein each inferior hinge structure selected from the plurality of inferior hinges is a fastening device;
wherein each selected inferior hinge structure is a rotating device;
wherein each selected inferior hinge structure attaches to an initial individual weight bar structure selected from the plurality of weight bar structures to an adjacent individual weight bar structure selected from the plurality of weight bar structures such that the adjacent selected individual weight bar structure will rotate relative to the initially selected individual weight bar structure;
wherein each selected inferior hinge structure rotates the adjacent selected individual weight bar structure between the deployed position and the storage position.

12. The mud flap assembly for mobile home transport according to claim 11, wherein the plurality of superior hinges and the plurality of inferior hinges work through the plurality of barrier plate mounts and the plurality of weight bar structures respectively to assemble the plurality of barrier plate structures into the deployed lateral shape of the plurality of barrier plate structures.

13. The mud flap assembly for mobile home transport according to claim 12,
wherein each individual barrier plate mount selected from the plurality of barrier plate mounts comprises a flat bar structure and a superior anchor plate structure;
wherein each individual barrier plate mount selected from the plurality of barrier plate mounts is identical;
wherein the flat bar structure is a flat bar;
wherein the superior anchor plate structure attaches the flat bar structure to the barrier structure of the associated individual barrier plate structure such that the major axis of the flat bar structure is parallel to the horizontal axis of the barrier structure;
wherein the superior anchor plate structure attaches the flat bar structure to a lateral face of the structure of the barrier structure;
wherein the flat bar structure removably attaches the superior anchor plate structure to the trailer using hardware.

* * * * *